UNITED STATES PATENT OFFICE.

MORRIS L. WEISS, OF BROOKLYN, NEW YORK, ASSIGNOR TO DOVAN CHEMICAL CORPORATION, OF WILMINGTON, DELAWARE, A CORPORATION OF DELAWARE.

PROCESS OF MAKING DIPHENYLGUANIDINE.

1,422,506.     Specification of Letters Patent.     Patented July 11, 1922.

No Drawing.     Application filed July 2, 1921. Serial No. 482,143.

*To all whom it may concern:*

Be it known that I, MORRIS L. WEISS, a citizen of the United States, residing in the borough of Brooklyn, county of Kings, city and State of New York, have invented certain new and useful Improvements in Processes of Making Diphenylguanidine, of which the following is a full, clear, concise, and exact description.

Diphenylguanidine is indicated by the formula

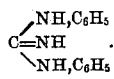

The object of my invention is the production of this substance in large or commercial quantities so that the same may be available in the chemical industries and particularly as an accelerator in the vulcanization of rubber compounds, as set forth in my co-pending application Serial No. 514,727, filed November 12, 1921, for vulcanization accelerators.

Prior to my invention it has not been possible to produce diphenylguanidine except in small quantities for use in chemical research and laboratory experiments. Even when produced for this purpose the product has been accompanied by the formation of comparatively large quantities of carbodiphenylimide, a thick treacle-like fluid, from which the diphenylguanidine is difficult to separate and which greatly reduces the yield of the latter.

Substituted guanidine was probably first synthetically produced in 1848 by A. W. Hoffman (Am. Chem.-Parm 67,—129). Dry cyanogen chloride gas was passed into anhydrous aniline, from which he obtained the hydrochloride of a base which he termed "melaniline," at that time.

In 1869, Hoffman (Ber. 11,—460) synthesized diphenylguanidine by an entirely different method from that previously used. Thiocarbanilide was desulphurized with lead oxide in a solution of alcoholic ammonia. The resulting product had the same properties as that of his first product except that its melting point was 147° C. instead of 120°–130° C.

By Hoffman's last method, a large quantity of polymerized carbodiphenylimide is produced, due to the volatility of the ammonia, and so reduces the yield of diphenylguanidine that it is not possible to produce the chemical commercially. The very high volatility of the ammonia at the temperature of the reaction also results in a large loss. Schall has shown (Ber. 27,—2696) that carbodiphenylimide has a tendency to polymerize into three different isomeric forms. This may be accomplished by either digesting by itself or with acids, or on standing for several hours.

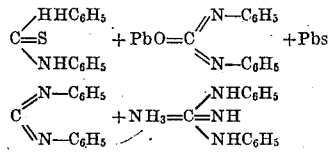

Carbodiphenylimide being very unstable, changes into isomeric forms before the combination with ammonia takes place. The longer the combination is delayed the more of the isomers are produced. The isomers do not combine with ammonia to form diphenylguanidine.

Weith (Ber. VII. 10—16) who first produced carbodiphenylimide or desulphurized diphenylthiourea

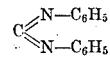

has shown that it combines with ammonia probably to form diphenylguanidine and that it is polymerized to form carbodiphenylimide. It also combines with water to form diphenylurea. By taking advantage of these suggestions and using an alcohol-water solution and by substituting an ammonium salt such as ammonium nitrate, sulphate, or chloride, which are not volatile at the reaction temperature 65°–70° C., I am enabled to minimize to a large extent the production of polymerized carbodiphenylimide, which otherwise forms due to the volatility of the ammonia, and thereby obtain a larger yield of diphenylguanidine.

I also found that the percentage of concentration of the alcohol and water solvent had an important effect on the reaction.

One form of the process, which I at present deem preferable, may therefore be described as follows:

Thiocarbanilide is first produced by any suitable method but I prefer to mix 65 parts by weight of carbon bisulphide with 1 part of sulphur, and 120 parts of aniline is then added. The mixture is then brought to a temperature of about 35°–40° C. and kept at that temperature for several hours after which it is allowed to cool. The semi-solid mass resulting is then spread out to allow an evaporation of the excess of carbon bisulphide and to dry the thiocarbanilide.

The solvent is then prepared by heating about 60 gallons of alcohol having a specific-gravity of from .850 to .900 in a suitable kettle or tank and then adding 50 lbs. of ammonium nitrate and the thiocarbanilide above mentioned. The tank is closed by a cover and the temperature of the mixture is gradually raised to about 50° C. and stirred continuously by a mechanically operated stirring device. When said temperature is reached 200 lbs. of litharge are then added and the stirring continued for about one hour, during which time the temperature is gradually raised to about 75° C. At this point a test quantity is withdrawn and tested for thiocarbanilide and if not positive a few pounds more of litharge are added and the stirring continued for a short time or until the desulphurization is complete. The contents of the tank is then allowed to settle, the alcohol drawn off and removed from the lead sulphide by a suitable filter press or other means. The alcoholic solution is then distilled to a specific gravity of .950 and then mixed while hot with about 125 gallons of water and the solution boiled for about one hour. This causes all of the diphenylguanidine nitrate to dissolve, leaving the heavy treacle-like mass of polymerized carbodiphenylimide undissolved excepting a small portion of the latter which goes into solution and which may be removed by adding one or two pounds of "filter-cel," which is diatomaceous earth in the form of a powder used for the purpose of filtering. The solution is then syphoned off and allowed to cool, after which a 25% solution of caustic soda is added, while stirring vigorously until the precipitation is complete. When completely settled the supernatant liquid is drawn off, the diphenylguanidine is filtered out, washed with water and dried.

I have discovered that the diphenylguanidine thus obtained may be further purified for use in particular processes by dissolving and recrystallizing in toluol. The difference in the degree of solubility of diphenylguanidine in hot toluol over that when cold is very marked. It has been found that toluol at its boiling point will dissolve to form a 50% solution of this substance while cold toluol will dissolve only to about 2 per cent.

I therefore dissolve the diphenylguanidine in the portion of about 2½ lbs. of the latter to a gallon of toluol which is thus raised to a temperature of about 105° C. in a closed container. The hot solution is then filtered and allowed to cool, settle and to stand until crystallization is complete.

The crystals are then filtered out and washed several times with fresh or pure toluol to remove the remaining traces of the impurities. About 70 lbs. of pure diphenylguanidine is thus obtained.

Having described this example of the invention, I do not wish to be understood as being limited to the exact proportions, ingredients, temperatures, and steps set forth, for various changes may be made without departing from the essential features of my invention. For example, other solvents than alcohol may be used, such as wood alcohol, pyridine, etc., and other ammonium salts may be employed instead of ammonium nitrate above mentioned.

What I claim and desire to protect by Letters Patent is:

1. The process of making diphenylguanidine which comprises, desulphurizing thiocarbanilide by the use of a metallic oxide in an alcoholic solution of an ammonium salt.

2. The process of making diphenylguanidine which comprises desulphurizing thiocarbanilide by the use of a lead oxide in an alcoholic solution of an ammonium salt.

3. The process of making diphenylguanidine which comprises desulphurizing thiocarbanilide by the use of a lead oxide in an alcoholic solution of ammonium nitrate.

4. The process of making diphenylguanidine which comprises desulphurizing thiocarbanilide by the use of litharge in an alcoholic solution of ammonium nitrate.

5. The process of making diphenylguanidine which comprises dissolving an ammonium salt and thiocarbanilide in an alcoholic solution, then adding a lead oxide and heating to 75° C. to desulphurize the thiocarbanilide. then dissolving the diphenylguanidine nitrate thus formed, then separating the remaining carbodiphenylimide from said solution by causing precipitation with an alkaline solution, and then washing and drying the precipitate.

6. The process of making diphenylguanidine which comprises dissolving ammonium nitrate in an alcoholic solution, then adding litharge and heating to 75° C. to desulphurize the thiocarbanilide, then dissolving the diphenylguanidine nitrate thus formed, by distillation to a specific gravity of .950 and by addition of hot water, and then separating the carbodiphenylimide from said solution by causing precipitation by the addition of caustic soda, and then washing and drying the precipitate.

7. In a process of making diphenylguanidine the steps which comprise adding an alkali to a solution thereof containing carbodiphenylimide to cause precipitation, and then washing and drying the precipitate.

8. In a process of making diphenylguanidine the steps which comprise adding caustic soda to a solution thereof containing carbodiphenylimide to cause precipitation, and then washing and drying the precipitate.

9. In a process of making diphenylguanidine containing as a reaction impurity carbodiphenylimide, the steps which comprise dissolving the same in hot toluol, cooling and then washing the crystals thus formed.

10. In a process of making diphenylguanidine containing as a reaction impurity carbodiphenylimide, the steps which comprise dissolving the same in hot toluol, cooling, and then washing the crystals thus formed with pure toluol, and then drying.

Signed June 28th, 1921.

MORRIS L. WEISS.